United States Patent [19]

Marshall

[11] Patent Number: 4,613,253
[45] Date of Patent: Sep. 23, 1986

[54] UNDERWATER DISCHARGE SYSTEM

[75] Inventor: James B. Marshall, Jackonsville, Fla.

[73] Assignee: Westinghouse Electric Corp., Pittsburgh, Pa.

[21] Appl. No.: 607,097

[22] Filed: May 4, 1984

[51] Int. Cl.⁴ .......................... F16T 1/00; E02B 17/00
[52] U.S. Cl. ..................................... 405/195; 376/283; 376/912
[58] Field of Search .................. 405/195, 203–208; 396/285, 283, 912; 60/685, 687; 114/264, 258

[56]  References Cited

U.S. PATENT DOCUMENTS

| | | | |
|---|---|---|---|
| 327,281 | 9/1885 | Letckus | 285/10 |
| 2,927,599 | 3/1960 | Stetson | 137/247 |
| 3,118,818 | 1/1964 | Bray | 376/912 X |
| 3,311,142 | 3/1967 | Bergstrom | 141/388 |
| 3,389,671 | 6/1968 | Yost | 114/265 |
| 3,601,410 | 8/1971 | Guinard | 277/27 |
| 4,050,252 | 9/1977 | Nakanishi | 376/912 X |
| 4,494,599 | 1/1985 | Kals | 60/687 X |

Primary Examiner—Dennis L. Taylor
Attorney, Agent, or Firm—Daniel C. Abeles

[57] ABSTRACT

An underwater discharge system for discharging an effluent overboard through an aperture in a wall of an at least partially submersed structure. The effluent is discharged through a conduit into a pressurized chamber which is open to and extends below the surface of the water in which the effluent is to be discharged. The pressure in the chamber is maintained to sustain the level of water in the chamber below that at which the conduit enters the chamber. A tubular catchment for transporting the effluent to a location remote from the structure is positioned to have one end within the chamber, above water level, open to the chamber's atmosphere, and sized and arranged to receive the conduit within its opening. Pressure within the chamber is maintained to keep the effluent from spilling over the one end of the catchment into the water in the chamber. The other end of the catchment communicates with a discharge basin which transports the effluent to the remote location.

11 Claims, 3 Drawing Figures

UNDERWATER DISCHARGE SYSTEM

BACKGROUND OF THE INVENTION

This invention pertains generally to underwater discharge systems and more particularly, to systems that are employed to discharge an effluent overboard from a floating vessel, underwater, to a remote location.

The concept of offshore siting of nuclear power generating facilities has been considered for some time. The worsening trends in finding suitable land sites along the coast, power plant cost escalation, schedule delays, the growing concern over the environmental impact of nuclear power generating stations and the desire for standardization to facilitate the licensing process have lent impetus to a serious consideration of offshore siting. The development of a floating nuclear plant requires that new design considerations be addressed to accommodate the unique environment in which the plant is to be situated. One such consideration is the mechanism to be employed to carry the cooling water discharge from the plant condenser, underwater, to a location in effect "downstream" of the cooling water intake.

Since floating nuclear plants will be subject to large movements due to tide, wind and wave action, a device in the overboard condenser coolant discharge piping system which will permit such motion, while at the same time maintaining the integrity of the fluid carrying system, is required. Some additional constraints on the system are that it be leakage free, not serve as an impediment to service barge traffic or the barge loading dock, and that it minimize pumping, maintenance and installation requirements.

One proposed system employs a gooseneck piping arrangement with the outlet end submerged. However, analysis has shown this configuration presents high pump power requirements, large weight additions, and unstable flow and support problems.

A second such system, which provides an improvement to the gooseneck piping system, is described in U.S. patent application Ser. No. 928,948, filed July 28, 1978. This latter system employs a submerged piping arrangement constructed with neutral buoyancy, which enables it to be self supporting and flexible to accommodate barge motion. However, the system does not overcome the cost of substantially large piping runs that will be required through the barge to transport the coolant overboard.

Accordingly, an improved piping arrangement is desired for transporting the condenser coolant discharge of a floating nuclear plant to an external location downstream of the condenser inlet that overcomes the aforestated deficiencies of previously proposed systems.

SUMMARY OF THE INVENTION

Briefly, this invention satisfies the above requirements by providing a system which permits the condenser coolant to be discharged through a submerged portion of the barge hull, without affecting the integrity of the barge. The system transports the discharging effluent through a conduit into a pressurized chamber which is open to and extends below the surface level of the water into which the discharge is to be made. The chamber is pressurized to maintain the level of water in the chamber below the point at which the conduit enters the chamber. A discharge catchment, for communicating the effluent to a remote location, is positioned with one end in the chamber open to the chamber's atmosphere. The catchment is sized and arranged to receive the discharge conduit within its opening, and extends from its one end, within the chamber, underwater, to a system for transporting the effluent underwater to the remote location. The chamber's pressurization is maintained at a controlled level which is established to prevent the effluent from spilling over the one end of the catchment into the water in the chamber. The catchment is fixedly supported with respect to the underwater transport system, and the discharge conduit is fixedly supported with respect to the barge and slidably movable within the catchment, while being maintained within the catchment's opening, to accommodate changes in the elevation of the barge.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
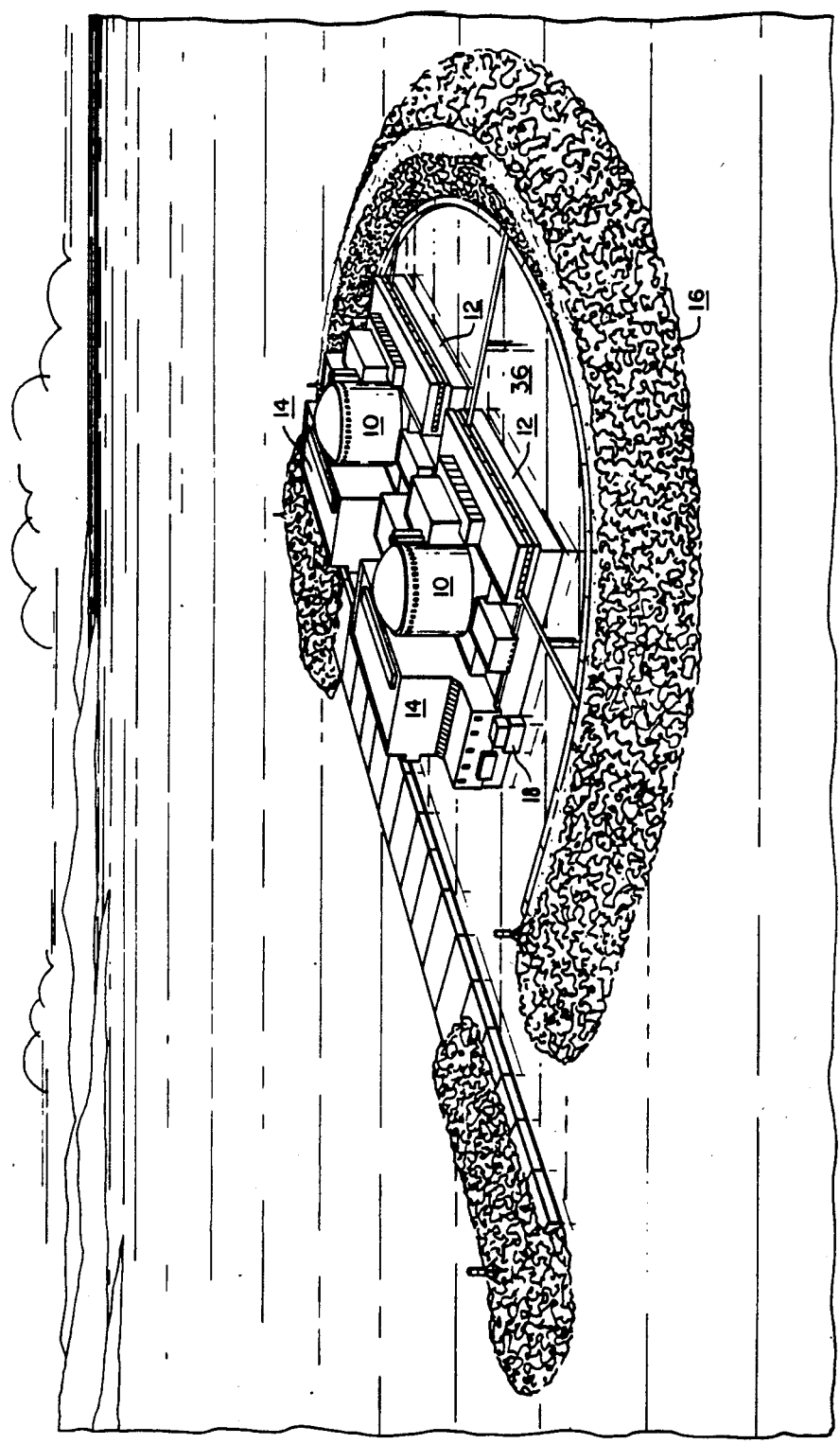
FIG. 1 is a perspective view of a floating nuclear facility employing the invention.

The basic concept of a floating nuclear power station is described in U.S. Pat. No. 4,206,013 issued June 3, 1980, and a perspective view of such a station is illustrated in FIG. 1. As shown, the floating nuclear facility is a totally integrated power station mounted on a floating platform 12. The power station illustrated employs conventional pressurized water reactors with ice condenser containments 10 and turbine generator facilities 14. The perspective view of the facilities shown in FIG. 1 includes two power plant arrangements secured in mirror image relationship. A breakwater 16 surrounds and protects the plants and forms a basin in which the plants are moored. As previously pointed out, the station has to be designed to withstand the effects of the relative motion of the operating components induced by environmental conditions such as four foot waves. The benefits that can be realized from this invention can be particularly appreciated in such an arrangement since the invention permits rigid support of the condenser discharge piping on the ocean floor and at the barge without placing undue stress on the piping system or its coupling to or through the barge platform 12. In addition, the invention permits a more convenient discharge penetration location through the barge, which reduces the cost of extensive piping runs which would have otherwise been required.

The condenser arrangement employed is more particularly described in the aforecited patent, but generally comprises a heat exchanger through which seawater is pumped and placed in heat exchange relationship with the exhaust steam from the turbine. The condensed steam exiting from the heat exchanger is returned to the feedwater side of a steam generator, while the exiting seawater coolant is discharged overboard downstream of the condenser intake, preferably outside of the breakwater, to avoid raising the temperature of the condenser coolant inlet.

Figure 3:
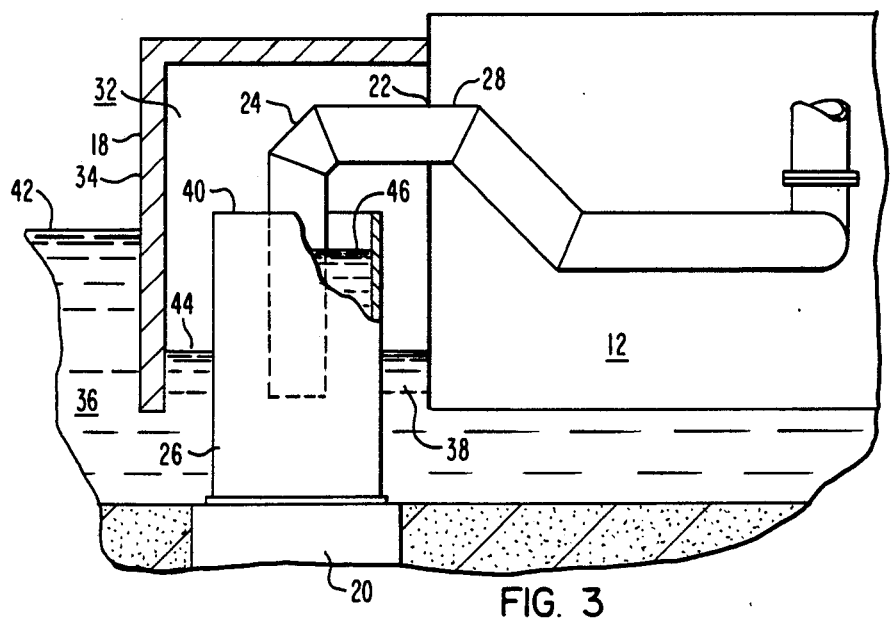
FIG. 3 is a schematic diagram of a section of a barge incorporating the underwater discharge system of this invention arranged to permit discharge through a side of the barge hull.

In accordance with one embodiment of this invention, illustrated in FIG. 3, the condenser coolant is discharged to a remote location outside of the breakwater through a penetration 22 in the barge hull via coolant discharge conduit 24, discharge catchment 26 and an underground discharge basin 20. The basin 20, formed from a cement casing anchored to the ocean floor, directs the discharge stream outside of the breakwater a significant distance downstream of the condenser inlet. Desirably, in the embodiment illustrated in FIG. 3, the coolant enters the discharge conduit 24, from the condenser, at an elevation above the discharge header 28 to create a sufficient head to drive the coolant around the header 28 so it can be deposited under the force of the gravity into the catchment 26. The discharge conduit 24 passes from the interior of the barge 12 through the penetration 22 into a pressure chamber 32. The barge 12 illustrated in FIG. 3 is shown floating in the basin which is defined by the breakwater 16 shown in FIG. 1. The housing 34 of the pressure chamber 32, is formed as an appendage to the barge hull, which extends into and below the surface of the water in the basin, 36, and is open to communicate with the water at its underside 38. The catchment 26 is a tubular conduit having one end 40 extending into the pressure housing 32, substantially above its open end 38; preferably to an elevation which is above the normal surface level 42 of the water outside the housing 34. The catchment 26 is sized to receive the discharge conduit within its open end 40 and is coupled at its opposite end to the discharge basin 20. The discharge conduit 24 extends through a hermetic seal at the barge penetration 22 through the pressure chamber 32 well into the open end 40 of the catchment 26. The pressure in the chamber is established to maintain the level 44 of the basin water within the chamber, and the level 46 of the condenser coolant discharge within the catchment, below the open end of the catchment 40; as well as maintain the basin water level 44 below the penetration 22. In this way (i) the condenser coolant discharged into the catchment is prevented from mixing with the water in the basin before it is discharged at the remote location, thus avoiding excessive heat buildup at the condenser coolant intake; (ii) any caustic interaction between the seawater and the penetration seal is minimized; and (iii) the discharge conduit and catchment can be independently supported while permitting the movement therebetween to accommodate changes in the elevation of the barge.

A difference in the level of the basin water within the chamber and the condenser coolant discharge level 46 in the catchment may arise, as illustrated in FIG. 3, as a result of a difference in water heads, respectively, at the remote discharge and pressure chamber locations. Desirably, the height of the open end 40 of the catchment 26 will extend above the normal water level 42 outside the chamber to minimize the opportunity for spillage into the catchment upon a loss of pressure within the chamber. Similarly, the height of the open end 40 of the catchment is desirably positioned above the normal water level at the remote discharge location.

Figure 2:
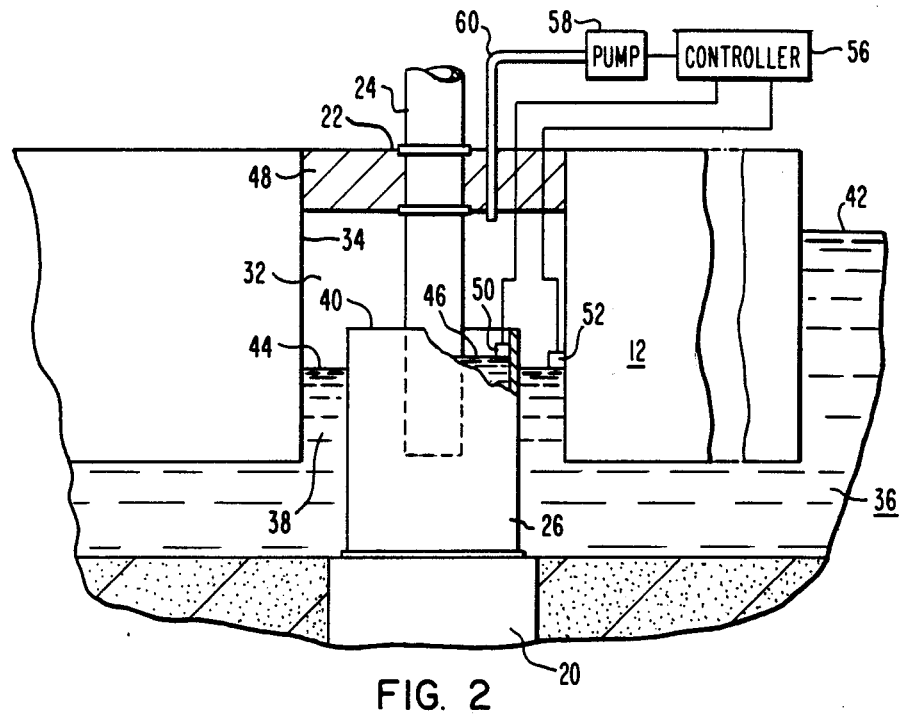
FIG. 2 is a schematic diagram of a section of a barge incorporating the underwater discharge system of this invention arranged to permit discharge through the underside of the barge hull.

A second embodiment of this invention, illustrated in FIG. 2, permits the condenser coolant to be discharged directly through the submerged hull of the barge 12. This arrangement minimizes the length of discharge conduit 24 required by enabling the barge hull penetration 22 to be positioned at a location near the condenser. It should be appreciated that like reference characters are employed in the various figures to denote the common elements of this invention in the several embodiments. In the embodiment illustrated in FIG. 2 the sides of the penetration 22 through the hull of the barge 12 form the walls of the pressure chamber 32. A seal 48 isolates the interior of the barge 12 from the chamber. Water level sensors 50 and 52, respectively, identify when the level of the coolant discharge within the catchment 26 and the level 44 of the basin water within the chamber are at or above their prescribed levels. The outputs of sensors 50 and 52 provide an indication to a controller, schematically shown by block 56, which controls a pressurizer 58, which establishes the desired pressure within the chamber 32 through conduit 60. For example, in this embodiment the chamber is pressurized with air, sensors 50 and 52 are water level sensors, well known in the art, and controller 56 is responsive to the sensor outputs to drive a pump 58 to establish the desired air pressure through conduit 60. In all other respects the underwater discharge system illustrated in FIG. 2 is the same as had been previously described with respect to FIG. 3.

Thus, in accordance with this invention the condenser effluent discharge is transported through a barge penetration within the vicinity of the condenser to a remote location via the discharge conduit 24, catchment 26 and basin 20; with sufficient head established by the pressure in chamber 32. In this way the discharge system of this invention reduces (i) the high costs of pipe and pipe fabrication, (ii) the weight due to long piping runs, (iii) the danger of flooding due to pipe rupture and penetration seal degradation, (iv) the necessity of an air removal system for start-up to remove air from the inverted U of a gooseneck arrangement, (v) expensive on-site fabrication, and (vi) problems associated with the height of the catchment basin. The invention also reduces concern about the integrity of the penetration seal due to the air blanket buffer. The chamber 32 can tolerate some leakage through the penetration seal without compromising the integrity of the barge.

Thus, in accordance with this invention air pressure from a source of sufficient head to equal the pressure loss in the basin piping is used to provide the necessary head in lieu of an increased water level within the catchment basin area. In addition to the advantages identified above, this approach provides more flexibility in the location of the discharge basin.

What we claim is:

1. An underwater discharge system for discharging an effluent overboard through an aperture in a wall of an at least partially submersed structure, comprising:
   a pressure chamber having a portion thereof constructed to be open to and extend a preselected distance below the surface of the water through which the effluent is to be discharged and having a second portion thereof communicating with the aperture;
   a discharge conduit for transporting the effluent, extending from the interior of the structure through the aperture into said pressure chamber and disposed in said chamber to discharge the effluent below the surface level of the water outside said chamber;
   means for sealing the wall of said chamber through which said discharge conduit passes to the exterior of said structure; and means for pressurizing said chamber to maintain the level of the water in said chamber a predetermined level below the elevation in said chamber at which said discharge conduit enters said chamber.

2. The underwater discharge system of claim 1 including means for sensing the level of the water in said chamber; said means for pressurizing said chamber being responsive thereto to maintain said water level below said predetermined level.

3. The underwater discharge system of claim 1 for discharging the effluent to a location remote from the structure including a tubular discharge catchment having one end extending a given distance into said chamber and positioned to receive the end portion of the discharge conduit therein, while said one end is sized to be maintained in fluid communication with said chamber; and having the other end of said catchment in fluid communication with an underwater discharge basin positioned to disperse the effluent at a location remote from the structure; and wherein said pressurizing means maintains the level of effluent in said one end of said catchment below said one end so that the effluent does not spill into said chamber.

4. The underwater discharge system of claim 1 or 3 wherein the wall is the hull of a floating vessel.

5. The underwater discharge system of claim 4 wherein said vessel is a floating barge mounted nuclear plant and said effluent is a condenser coolant discharge.

6. The underwater discharge system of claim 5 wherein the well is the submerged underside of said barge.

7. The underwater discharge system of claim 6 wherein the aperture in the wall defines said chamber.

8. The underwater discharge system of claim 3 including means for sensing the level of the fluid in said chamber; said means for pressurizing said chamber being responsive thereto to maintain said effluent level in said catchment below said one end.

9. The underwater discharge system of claim 3 or 8 including means for sensing the level of the water in said chamber; said means for pressurizing said chamber being responsive thereto to maintain the water level below said one end of said catchment to prevent mixing of the effluent and the water.

10. The underwater discharge system of claim 1 wherein said chamber is pressurized with a gas.

11. The underwater discharge system of claim 3 wherein said discharge conduit is slidably movable within said discharge catchment.

* * * * *